United States Patent
Higashibata et al.

(10) Patent No.: US 6,856,422 B1
(45) Date of Patent: Feb. 15, 2005

(54) IMAGE PROCESSING APPARATUS, IMAGE PROCESSING METHOD AND MEMORY MEDIUM

(75) Inventors: Takeyuki Higashibata, Tokyo (JP); Shumpei Takenaka, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,195

(22) Filed: Apr. 7, 2000

(30) Foreign Application Priority Data

Apr. 12, 1999 (JP) .......................... 11-103908
Dec. 1, 1999 (JP) .......................... 11-341904

(51) Int. Cl.[7] .............................. G06F 15/00
(52) U.S. Cl. ............ 358/1.18; 358/1.12; 358/403; 358/450
(58) Field of Search ............ 358/1.18, 1.12, 358/1.17, 450, 451, 1.15, 1.14, 403, 453, 487, 302, 442; 382/132; 715/517; 348/333.05, 564; 345/573

(56) References Cited

U.S. PATENT DOCUMENTS

| | | | |
|---|---|---|---|
| 5,010,498 A | 4/1991 | Miyata | 364/519 |
| 5,635,984 A | 6/1997 | Lee | 348/333 |
| 5,685,002 A | 11/1997 | Sano | 395/779 |
| 5,777,753 A | 7/1998 | McShane et al. | 358/302 |
| 5,878,198 A * | 3/1999 | Yuasa et al. | 358/1.18 |
| 6,188,490 B1 * | 2/2001 | Miyake | 358/1.18 |
| 6,493,108 B1 * | 12/2002 | Hirai | 358/1.18 |

FOREIGN PATENT DOCUMENTS

| | | | |
|---|---|---|---|
| EP | 0 429 049 A1 | 5/1991 | H04N/1/387 |
| EP | 0 435 254 A | 7/1991 | H04N/1/21 |
| EP | 0 478 970 A2 | 4/1992 | H04N/1/387 |
| EP | 0 511 607 A2 | 4/1992 | H04N/1/387 |

* cited by examiner

Primary Examiner—Twyler Lamb
(74) Attorney, Agent, or Firm—Fitzpatrick, Cella, Harper & Scinto

(57) ABSTRACT

There is provided an image processing apparatus capable of determining the optimum layout based on the designated conditions such as the number of images to be printed on a page, sheet size, number of division of sheet, number of print sheets, page change position designating information etc., and printing the designated images according to thus determined layout.

18 Claims, 16 Drawing Sheets

STANDARD ARRAY TABLE

| DS | REAL SIZE | | | |
|---|---|---|---|---|
| | A4 PORTRAIT | | A4 LANDSCAPE | |
| 1 | J/1 | K/1 | — | — |
| 2 | J/2 | K/1 | — | — |
| 3 | J/3 | K/1 | — | — |
| • | • | | • | |
| 8 | J/2 | K/4 | K/2 | J/4 |
| • | • | | • | |
| 12 | J/3 | K/4 | K/3 | J/4 |
| • | • | | • | |
| M | J/Ymax | K/Wmax | K/Ymax | J/Wmax |

M = Ymax · Wmax
A4 : K=297mm  J=210mm

FIG. 17

| | K 297 | J 210 | CALCULATION | DISCRIMINATION RESULT | AREA |
|---|---|---|---|---|---|
| (1) | K/4 74.25 | J/3 70 | 70/6×4=46.66 46.66<74.25 | GOOD | 3267 |
| (2) | K/4 74.25 | J/3 70 | 70/4×6=105 105>74.25 | NO GOOD | |
| (3) | K/3 99 | J/4 52.5 | 52.5/6×4=35 35<99 | GOOD | 1838 |
| (4) | K/3 99 | J/4 52.5 | 52.5/4×6=78.75 78.75<99 | GOOD | 4134 |

- (1) IMAGE ROTATED
- (2) PAPER ROTATED IMAGE ROTATED
- (3) PAPER ROTATED IMAGE ROTATED
- (4) PAPER ROTATED

| | K 297 | J 210 | CALCULATION | DISCRIMINATION RESULT | AREA |
|---|---|---|---|---|---|
| (1)' | K/4 74.25 | J/3 70 | 74.25/6×4=49.5 49.5<70 | GOOD | 3465 |
| (2)' | K/4 74.25 | J/3 70 | 74.25/4×6=111.38 111.38>70 | NO GOOD | |
| (3)' | K/3 99 | J/4 52.5 | 99/6×4=66 66<52.5 | NO GOOD | |
| (4)' | K/3 99 | J/4 52.5 | 99/4×6=148.5 148.5<52.5 | NO GOOD | |

- (1)' IMAGE ROTATED
- (2)' PAPER ROTATED IMAGE ROTATED
- (3)' PAPER ROTATED IMAGE ROTATED
- (4)' PAPER ROTATED

IMAGE PROCESSING APPARATUS, IMAGE PROCESSING METHOD AND MEMORY MEDIUM

BACKGROUND OF THE INVENTION

1. Field of the Invention

The present invention relates to an image processing apparatus, an image processing method and a memory medium capable of automatically arraying and printing all the image data or plural selected ones in a non-volatile memory medium storing image data for example taken with a digital camera or the like, on a designated sheet. It also relates to an image processing apparatus, an image processing method and a memory medium capable of automatic arraying for minimizing the number of sheets to be used for printing, and automatic array control for uniform print areas on one or more designated number of sheets.

2. Related Background Art

In case of printing plural images on a sheet by designating area division thereof with the conventional printing apparatus, the number of printed images, the printing position and area thereof for each sheet have to fixed and the images have to be designated in each sheet.

Also in case of printing a desired number of images by a certain plural number on each sheet with the conventional printing apparatus, if the desired number of images exceeds a number of images that can be accommodated in a sheet, there is required a cumbersome operation of designating the number of images per print sheet while designating the printing operation for each of the images and repeating such operation until the printing operation is completed.

Also in the aforementioned case of printing plural images on a print sheet, the number of images, position and area thereof in each sheet are fixed, so that there may result insufficient use of the print sheet such as only one image being printed on the last page, based on the relationship between the number of images per sheet and the desired number of images.

Also the number of print sheets is uniquely determined by the designation of the images to be printed so that it is not possible to designate both the desired number of the images to be printed and the number of print sheets, and it is not possible also to fix the number of print sheets by varying the print area.

SUMMARY OF THE INVENTION

In order to resolve the above-mentioned drawbacks, the present invention is to provide an image processing apparatus comprising input means for entering the number of images to be printed on a page, and process means for changing the page for each printing of the images of a number entered by the input means.

The present invention is also to provide an image processing apparatus comprising input means for entering the number of images to be printed on a page, and process means for printing the remaining images on a page, in case the number of the remaining images does not exceed the sum of the number of images entered by the input means and an additionally allowable number of images.

The present invention is also to provide an image processing apparatus comprising input means for entering the number of images to be printed on a page, and process means adapted, in case the number of images to be printed does not exceed the number of images designated by the input means, to execute printing with a layout based on the number of images designated by the input means, but, if the number of images to be printed exceeds the number of images designated by the input means, to execute printing with a layout based on the number of images predetermined for the size of the print sheet.

The present invention is also to provide an image processing apparatus comprising first determination means for determining the number of images to be printed on a page, based on the number of images and the number of pages to be printed, and second determination means for determining a layout for maximizing the size of the images to be printed according to the number of images determined by the first determination means.

The present invention is also to provide an image processing apparatus comprising input means for entering designation information for designating the images to be printed and page change information, and process means for effecting a page change process based on the page change information, in printing the images designated by the designation means.

BRIEF DESCRIPTION OF THE DRAWINGS

FIG. 17 is a view showing an example of calculation;

DESCRIPTION OF THE PREFERRED EMBODIMENTS

Now the present invention will be clarified by preferred embodiments thereof, with reference to the accompanying drawings.

Figure 1:
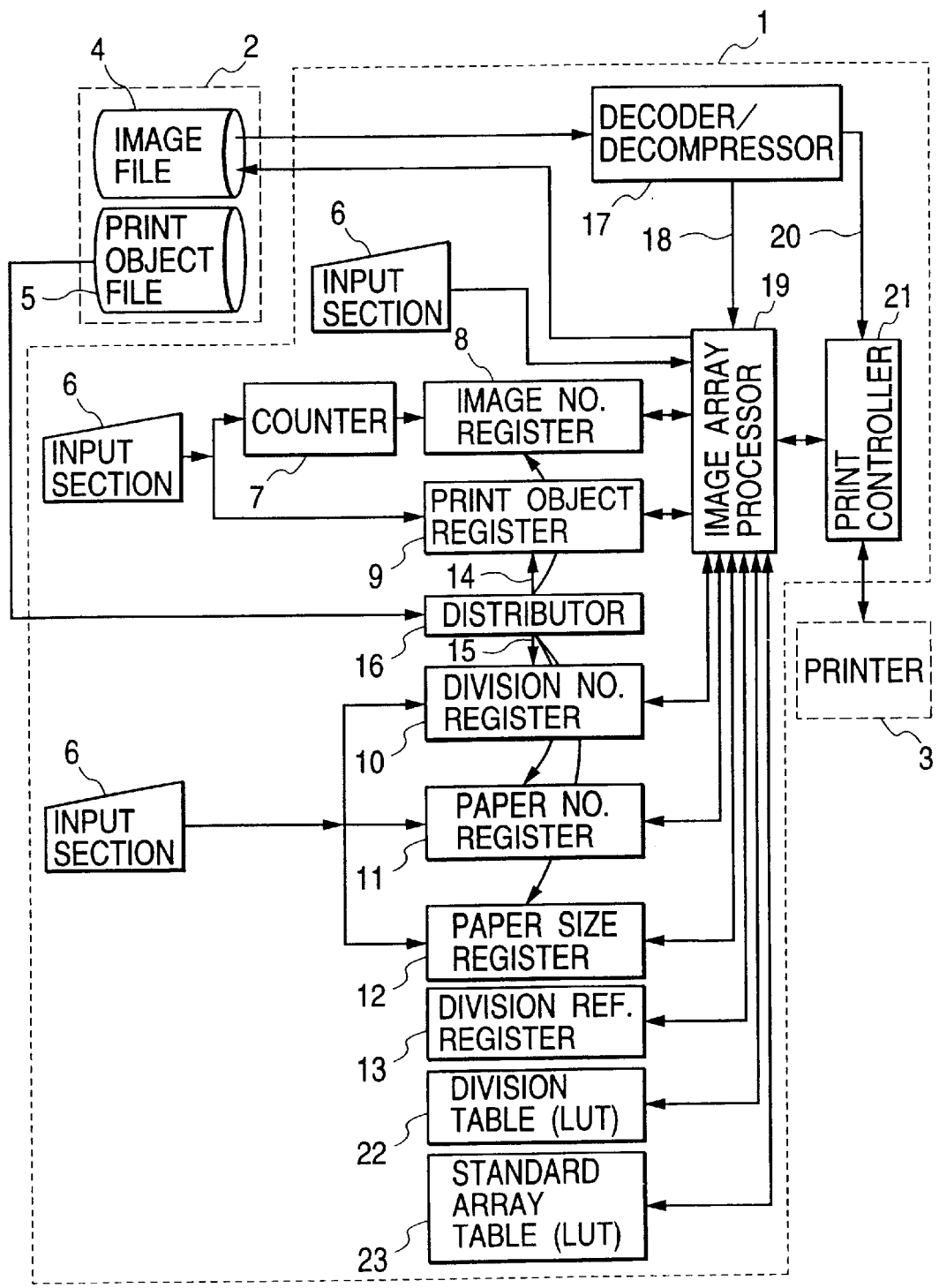
FIG. 1 is a block diagram of an appropriate layout print control apparatus for an electronic image.

FIG. 1 is a block diagram of an appropriate layout print control apparatus for electronic images, wherein a non-volatile memory medium 2 stores image data, taken with a digital camera or the like, as an image file 4. The above-mentioned non-volatile memory medium may also contain a print object/condition designating file 5 defining the image of print object and the print condition such as the print sheet. An input unit 6 is used for designating, at the automatic layout or array control, the image to be printed, the print conditions such as print sheet size and number of images per sheet, and the appropriate array mode. When the imaged signal (information) is selected and designated, the corresponding number is from time to time stored in a print object register 9, and the content of an image counting unit 7 is increased at the same time and is stored from time to time in a total image number register 8. Then a division number, indicating the number of images on a page in order to array and print plural images on a page, is entered from the input unit 6 and stored in a division number register 10. Similarly a desired number of print sheets and a desired size of print sheet are respectively stored in a sheet number register and a sheet size register. A division reference register 13 holds a print image size, which is determined by referring to a division table 22 at the completion of sheet setting based on a maximum division/array condition and a division number set for each sheet, or determined from the determination of the sheet and the division number, and also stores an additional image number and an arraying condition therefor in case the margin between the images is made minimum. The division table 22 stores, for example for a certain size, a maximum division number of 28 with a division number 7 in the vertical direction and a division number 4 in the horizontal direction. A standard array table 23 is provided for deriving the arraying condition, based on the relationship between a division value per page as shown in examples according to the aspect ratio (vertical-tohorizontal ratio) illustrated in FIG. 10 and the aspect ratio of the image. A distribution process unit 16 assigns and stores, in case the non-volatile memory medium storing the image data contains the print object/condition designating file 5, the decoded results thereof in the image total number register 8, print object register 9, division number register 10, sheet number register 11, and sheet size register 12. An image decoding/thawing process unit 17 executes decoding and thawing of the compressing condition of the image data, compressed for example by JPEG system. The pixel information obtained in the decoding/thawing process unit 17 is supplied to an image array process unit 19 for determining the array or layout conditions including the print output size and the output resolution, by referring to the image total number register 8, print object register 9, division number register 10, sheet number register 11, sheet size register 12 etc. A print control unit 21 converts the image data thawed according to the result from the image array process unit 19 into print data matching a printing device and sends the print data thereto. The print array process unit 19, in calculating the array condition, in advance acquires and stores conditions relating to the print layout, such as a printable area, through the print control unit. Programs corresponding to flow charts shown in FIGS. 6 to 9 are stored in a ROM of the image array process unit 19 shown in FIG. 1 and are executed by a CPU therein.

In the present embodiment, in a printing apparatus provided with means for entering image number information etc. for specifying the image data stored in the non-volatile memory medium, a control unit for decoding and thawing the image data, a control unit for printing the image data, and decoding means for a non-volatile memory medium storing the print object/condition designating file prepared by image designation means other than the present apparatus, there is executed printing with automatic page change by storing the print object image information, obtained by the input of the print object image number in the present apparatus or by the decoding of the print object/condition designating file, in a predetermined memory unit of the apparatus and arraying the images, designated according to thus stored information, in succession on the print sheets according to the image arraying condition on the sheet until all the images are printed.

Figure 12:
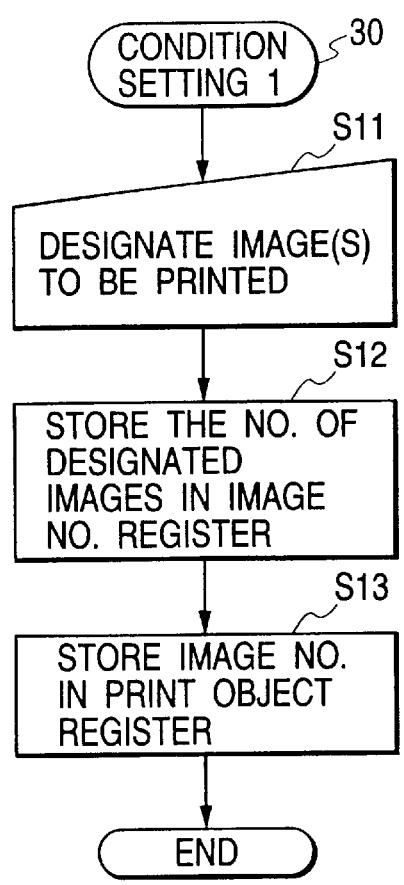
FIG. 12 is a flow chart showing a condition setting 1.

At first there will be explained a condition setting 1 process for designating the images, with reference to FIG. 12.

At first a step S11 executes a process of designating an image to be printed by the input from the manual input unit 6. Then a step S12 stores the total number of the designated images in the image total number register. Then a step S13 stores the image number of the image, designated by the manual input unit 6, in the print object register.

Figure 13:
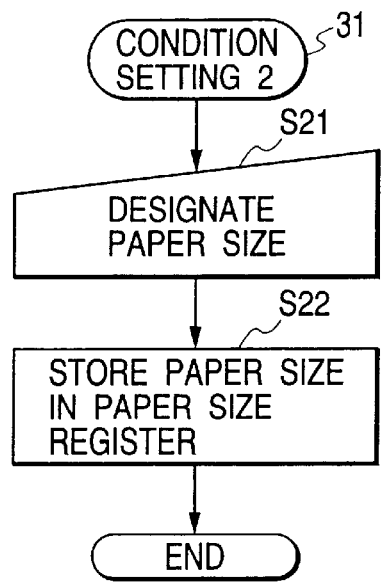
FIG. 13 is a flow chart showing a condition setting 2.

In the following there will be explained a condition setting 2 process for designating the images, with reference to FIG. 13.

At first a step S21 executes a process of entering the sheet size designation from the manual input unit 6. Then a step S22 stores the sheet size, entered from the manual input unit 6, in the sheet size register.

Figure 14:
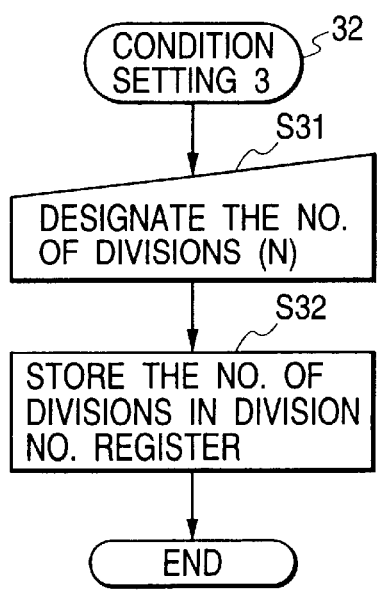
FIG. 14 is a flow chart showing a condition setting 3.

In the following there will be explained a condition setting 3 process for designating the images, with reference to FIG. 14.

At first a step S31 executes a process of entering the division number from the manual input unit 6. Then a step S32 stores the division number, entered from the manual input unit 6, in the division number register.

Figure 18:
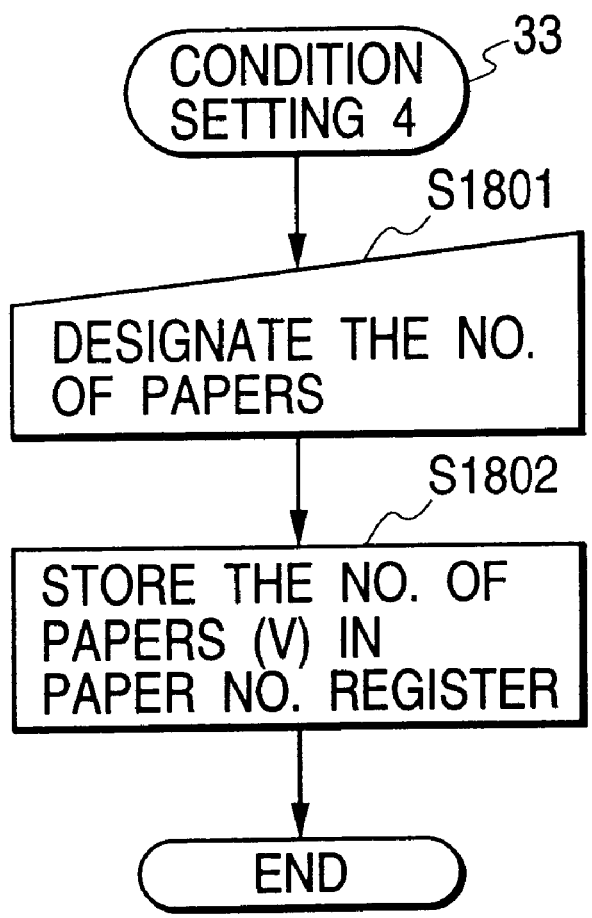
FIG. 18 is a flow chart showing a condition setting 4.

In the following there will be explained a condition setting 4 process for designating the images, with reference to FIG. 18.

At first a step S1801 executes a process of entering the sheet number from the manual input unit 6. Then a step S1802 stores the sheet number in the sheet number register 11.

Figure 6:
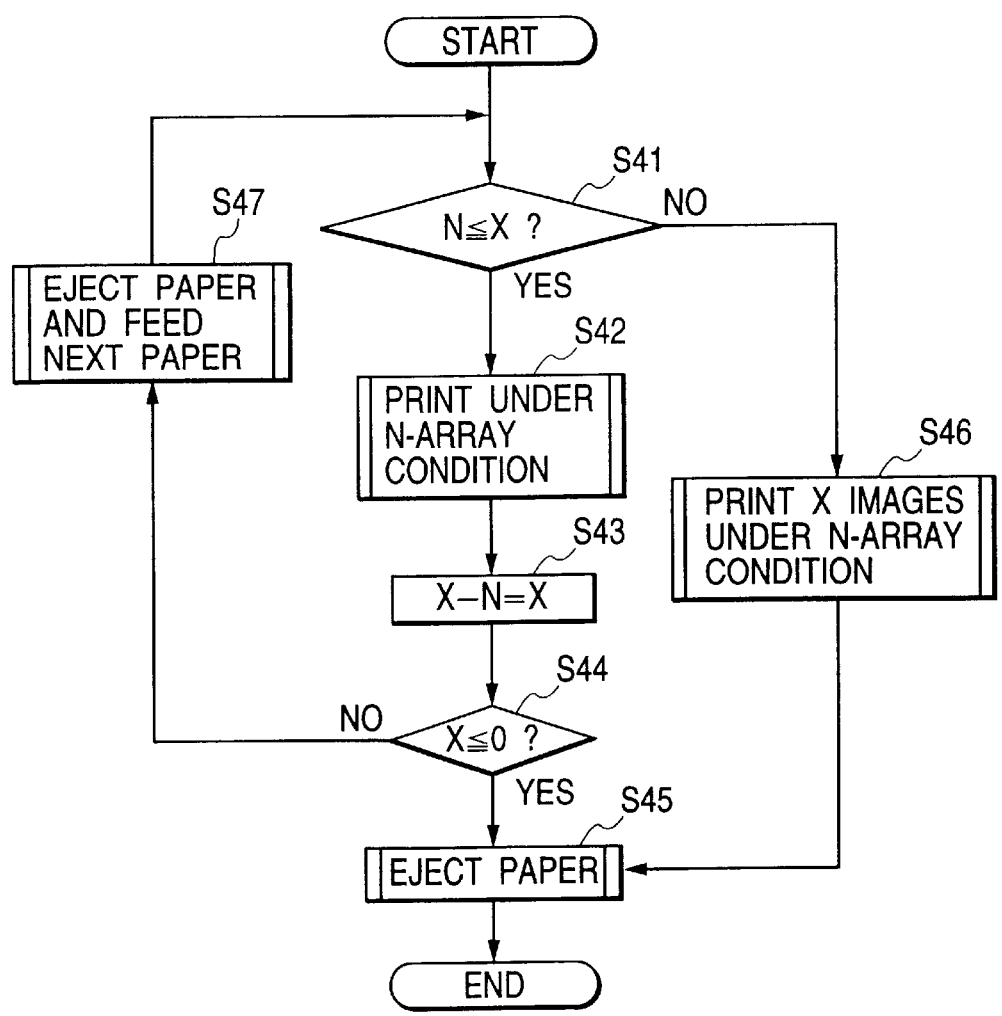
FIG. 6 is a flow chart showing the control sequence of automatic page change print control.

In the following there will be explained, with reference to FIG. 6, a process in case the automatic page change printing is instructed by the user after the condition settings 1, 2 and 3.

At first a step S41 discriminates whether the remaining image number X is at least equal to the division number n, and, if so, a step S42 executes a process and developing and printing the images according to an n-image division/array condition (for example with a 3×6 array). Then a step S43 sets X−n=X, and a step S44 discriminates whether X is 0 or less. If X is 0 or less, a step S45 executes a process of discharging the sheet, but, if not, the sequence proceeds to a step S47 for discharging the printed sheet and feeding a next sheet. Also if the step S41 identifies that the remaining image number X is less than n, the sequence proceeds to a step S46 for developing and printing the remaining images according to an n-image division/array condition. In this case there is generated a blank area corresponding to (n−X) images.

Figure 7:
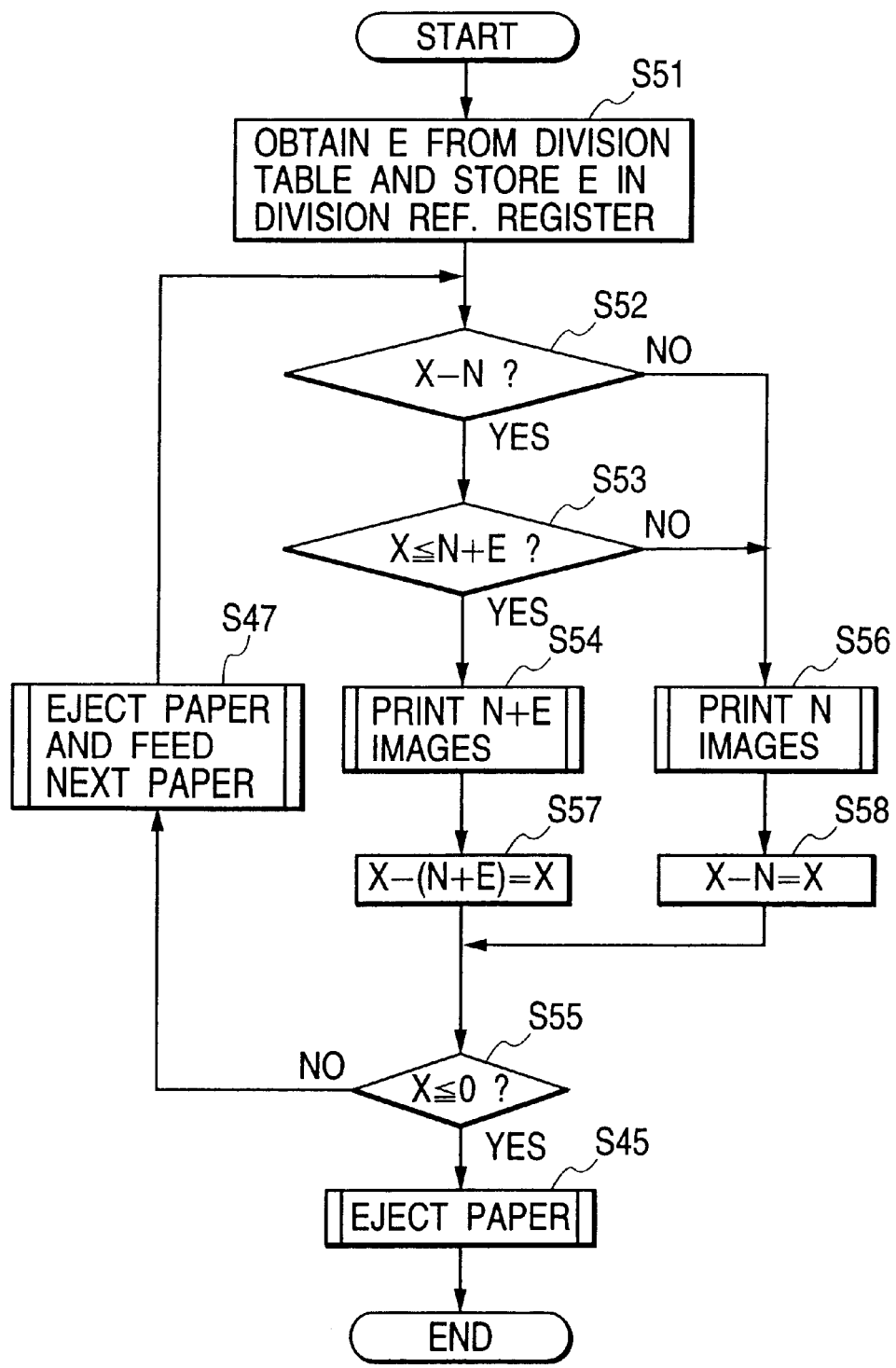
FIG. 7 is a flow chart showing the control sequence of image fill-in print control.

In the following there will be explained, with reference to FIG. 7, a process in case the fill-in printing is instructed by the user after the condition settings 1, 2 and 3.

In the present embodiment, if an inefficient print condition, such as only one image printed on the last page, is generated in the image layout according to the standard arraying information, based on the relationship between the number of designated images and the number of images per page, the image on the last page is filled into the preceding page by decreasing the standard margin between the images thereby securing a new print area in the unit of an image row or an image.

Figure 2:
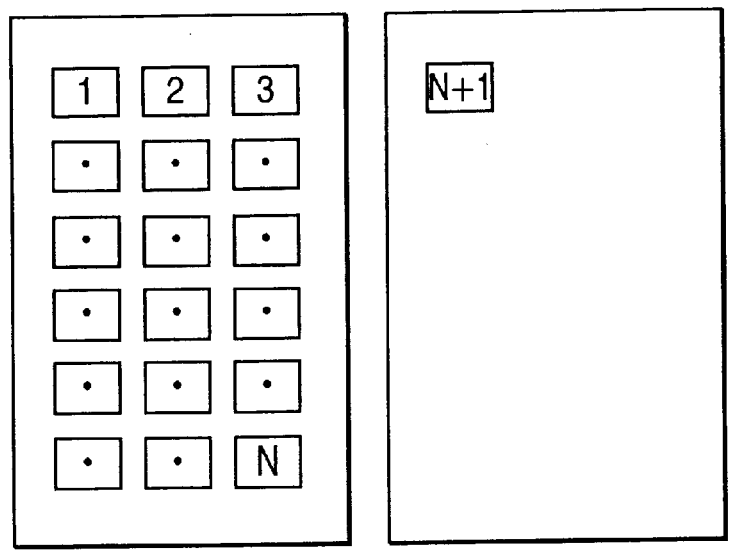
FIG. 2 is a view showing an example of automatic page change print control.
Figure 3:
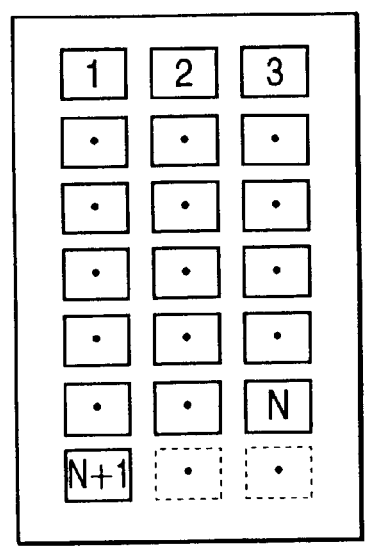
FIG. 3 is a view showing an example of image fill-in print control.

In such case, the fill-in printing is executed without changing the print area per image, designated or defined from the division number. The process shown in FIG. 7 prevents the inefficient printing, as exemplified by only one image printed on the second page as shown in FIG. 2, encountered in case of the automatic page change printing according to FIG. 6. A step S51 adopts the divided print size according to the condition designated in FIG. 6, and determines, by referring to the division table, the number of images that can be added to a page when the margin of division is made minimum based on the sheet size and the division number. The division table stores the standard array condition determined from the sheet size and the division value (array condition per page shown in FIG. 2), and, in combination, the number of images allowed in addition (in the example shown in FIG. 3, images e=3 can be added to the lowermost row).

If a step S52 identifies that x does not exceed the designated division number n; a step S56 executes printing by n-division. Then a step S58 sets X−n=X, and, when a step S55 identifies that the printing is completed, a step S45 discharges the sheet whereby the printing operation is completed. If the step S52 identifies that x exceeds the designated division number n, a step S53 compares the sum of the additionally allowed number e and the designated division number n with the designated image number x, and, if x does not exceed n+e, the sequence proceeds to a step S54 for changing the layout (decreasing the margin in the vertical direction in the example shown in FIG. 3), and the printing is executed under an additional array condition shown in the image fill-in printing control in FIG. 3. In such operation, the image content condition may be determined separately. Then a step S57 sets X−(n+e)=X, and, when a step S55 identifies that the printing is completed, a step S45 discharges the sheet whereby the printing operation is completed. In the step S53 comparing the sum of the additionally allowed number e and the designated division number n with the designated image number x, if x exceeds n+e, the printing is executed by arraying the designated images with the designated n-division. Then a step S58 determines x−n as the new total print number. Also the image numbers already printed are erased from the image object register or are given print completion flags. The process shown in FIG. 7 is thus continued until all the print objects are exhausted.

In the following there will be explained, with reference to FIG. 9, a process in case the array change fill-in change printing is instructed by the user after the condition settings 1, 2 and 3.

In this embodiment, there is executed the image fill-in print control with automatic image arraying by calculating an array condition for obtaining a minimum print sheet number and a maximum print size, in order to array and print all the designated images in a page within the maximum division number defined for each sheet size.

Figure 4:
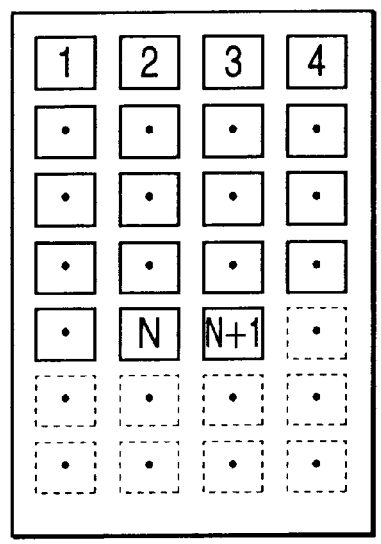
FIG. 4 is a view showing an example of layout change image fill-in print control.
Figure 8:
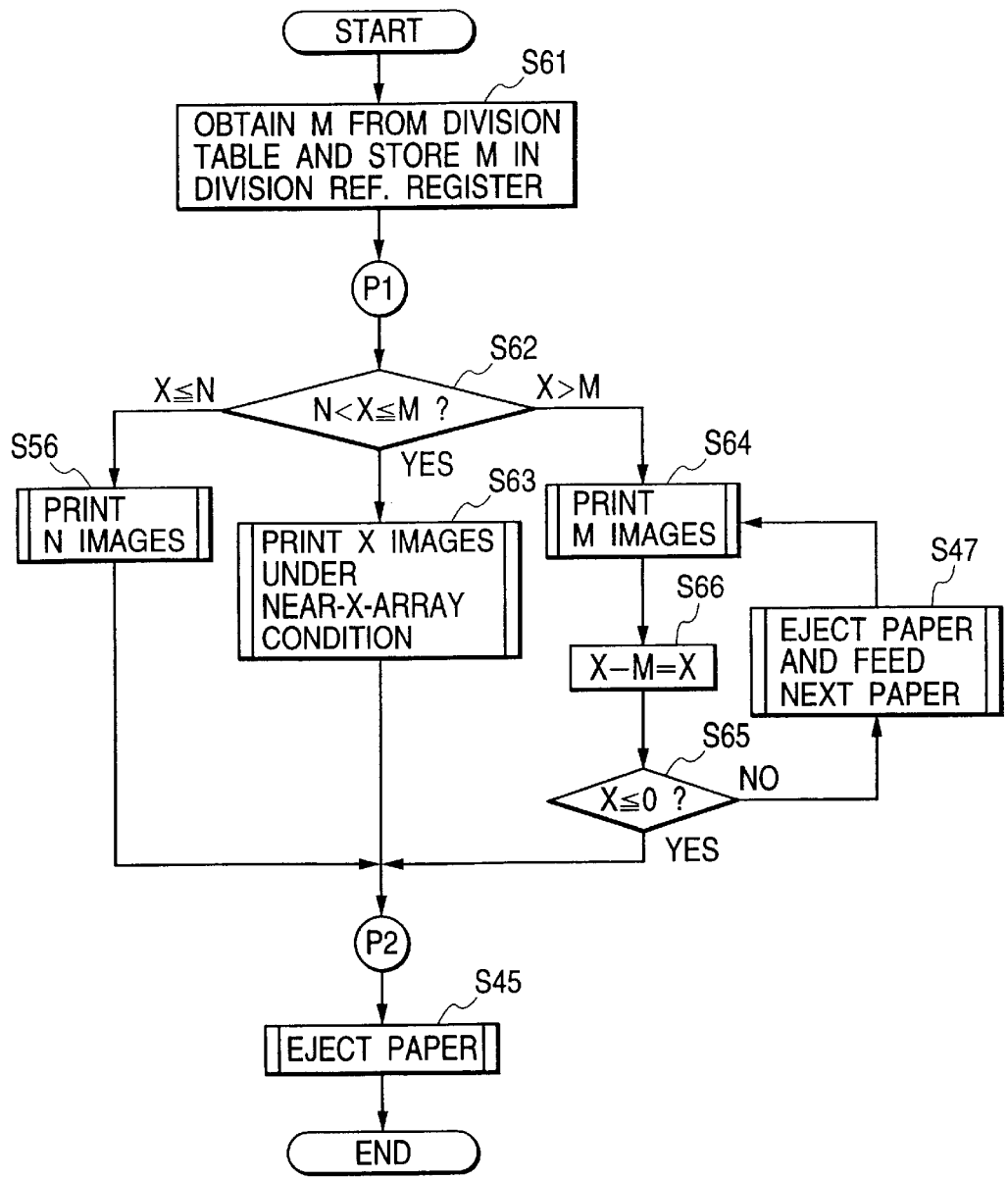
FIG. 8 is a flow chart showing the control sequence of layout change image fill-in print control.

In case a result as shown in FIG. 2 is obtained, the process of FIG. 8 changes the arraying or layout condition shown in FIG. 4 to improve the efficiency of use of the sheets. At first a step S61 refers to the division table 22 to obtain the maximum division number m for the sheet size and stores it in the reference register. If the discrimination in a step S62 identifies that the designated image number x is smaller than the designated division number n, there is executed print control by arraying the designated images with n-division. If the step S62 identifies that x is larger than the maximum division number m, the printing is executed by arraying the designated images with m-division, and, after the printing, there is calculated x−m as the new total print number. Also the image numbers already printed are deleted from the print object register or are given print completion flags. The process of the steps S64 and S65 are repeated until the print object becomes exhausted. If the step S62 identifies that the designated image number x is larger than the designated division number n but smaller than the maximum division number m, the print control follows X-division, but the actual printing operation is executed with an arraying condition providing the maximum print size close to X, obtained by referring to the standard array table 23, since the number of rows and/or columns has to be increased.

As an example, in case the condition setting 3 designates a division number 16 (4 in the vertical direction and 4 in the horizontal direction) and a maximum division number 28 (7 in the vertical direction and 4 in the horizontal direction) and if the designated image number does not exceed 16, the sequence proceeds to the step S56 for arraying and printing the images. If the designated image number is from 17 to 28, the sequence proceeds to the step S63 for arraying and printing the images. If the designated image number is 29 or larger, the sequence proceeds to the step S64 for arraying and printing 28 images in each sheet.

The process of the step S63 will be explained in the following with specific examples.

Figures 15, 16:
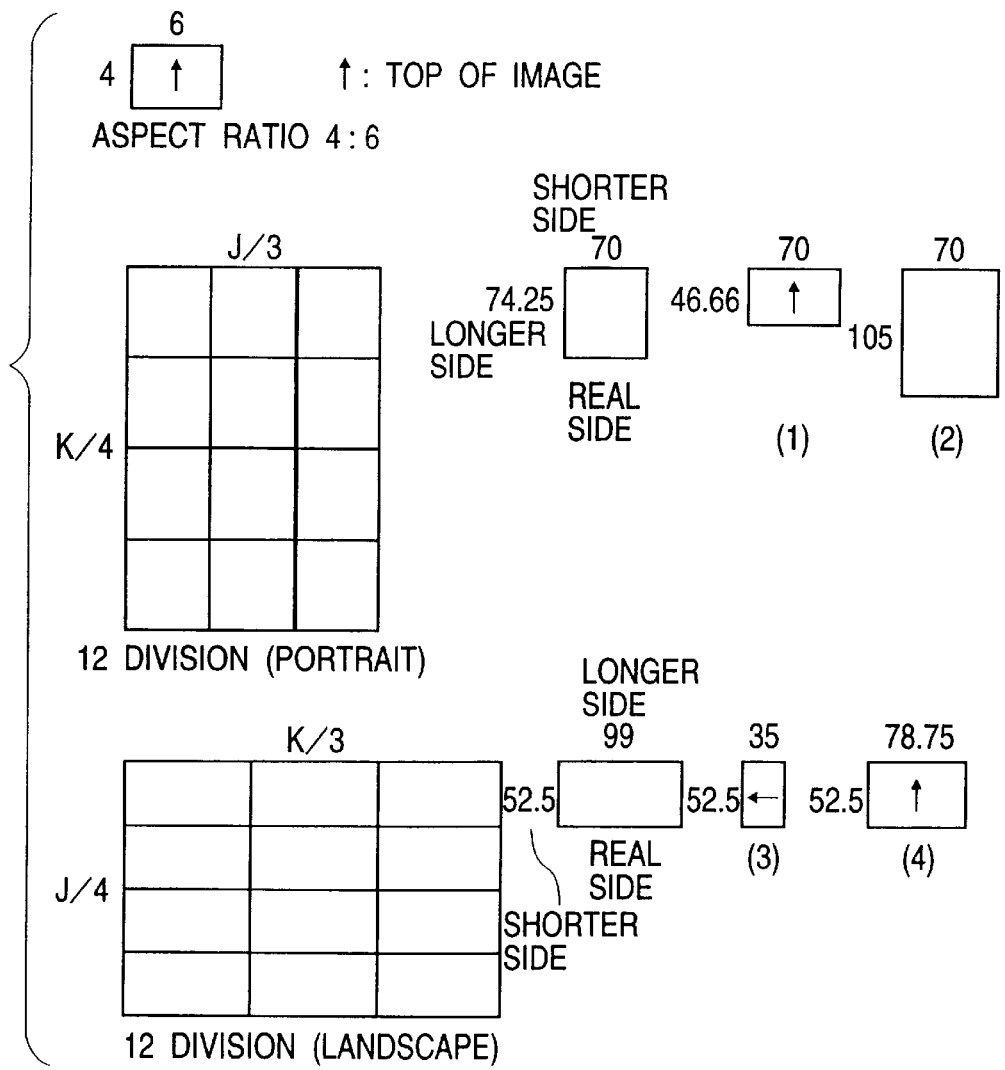
FIG. 15 is a view showing an example of the standard array table.
FIG. 16 is a view showing an example of division.

As an example, if the user designates a division number 9 on an A4-sized sheet for printing 11 images in total with an aspect ratio 4:6, there is read a row "11" in the column "dc" in the reference table shown in FIG. 15. If such row "11" is not defined, a nearby row "12" is read to obtain J(vertical)/3 and K(horizontal)/4, then the longer side is calculated from the shorter side as shown in FIGS. 16 and 17, and there is discriminated whether the calculated value can be accommodated within the actual divided size. If accommodated, such pattern is discriminated as acceptable, then the area is calculated for each acceptable pattern and there is selected a pattern with the largest area among such patterns. In the example shown in FIG. 17, (4) is selected. It is also possible to execute calculation based on the longer side as indicated by (1)', (2)', (3)' and (4)', then calculate the areas and select a pattern with the largest area.

In the following there will be explained, with reference to FIG. 9, a process in case the same image size printing is instructed by the user after the condition settings 1, 2, 3 and 4.

In this embodiment, the number of images to be printed and the number of print sheets are both designated, and the division is executed to obtain uniform print areas. There is executed such control as to change the dividing direction by 90° on the print sheet so as to maximize the uniformly divided area while maintaining the original aspect ratio of the image.

In case the designated image number and the designated sheet number are such that the predetermined maximum number of the images per page is exceeded, there is issued a warning for adding pages to the designated sheet number, and the printing is executed with such added sheet number in case the warning is accepted.

Figure 5:
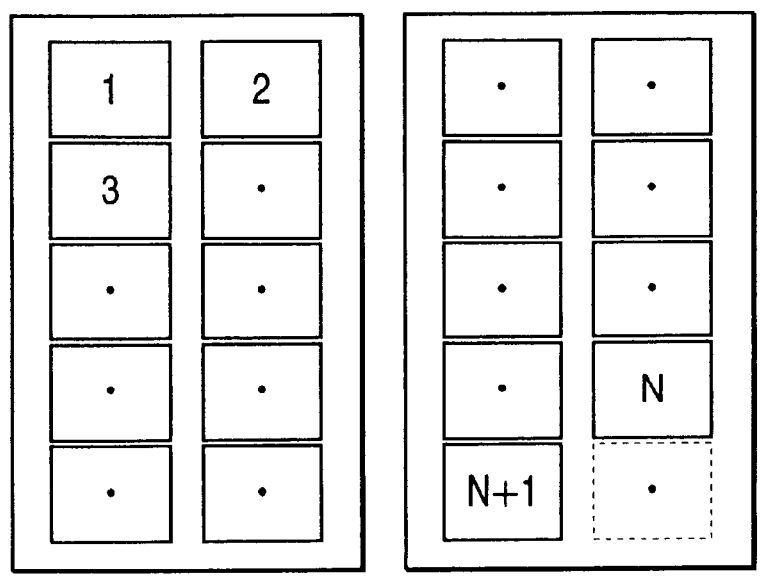
FIG. 5 is a view showing an example of sheet designated/same image size print control.
Figure 9:
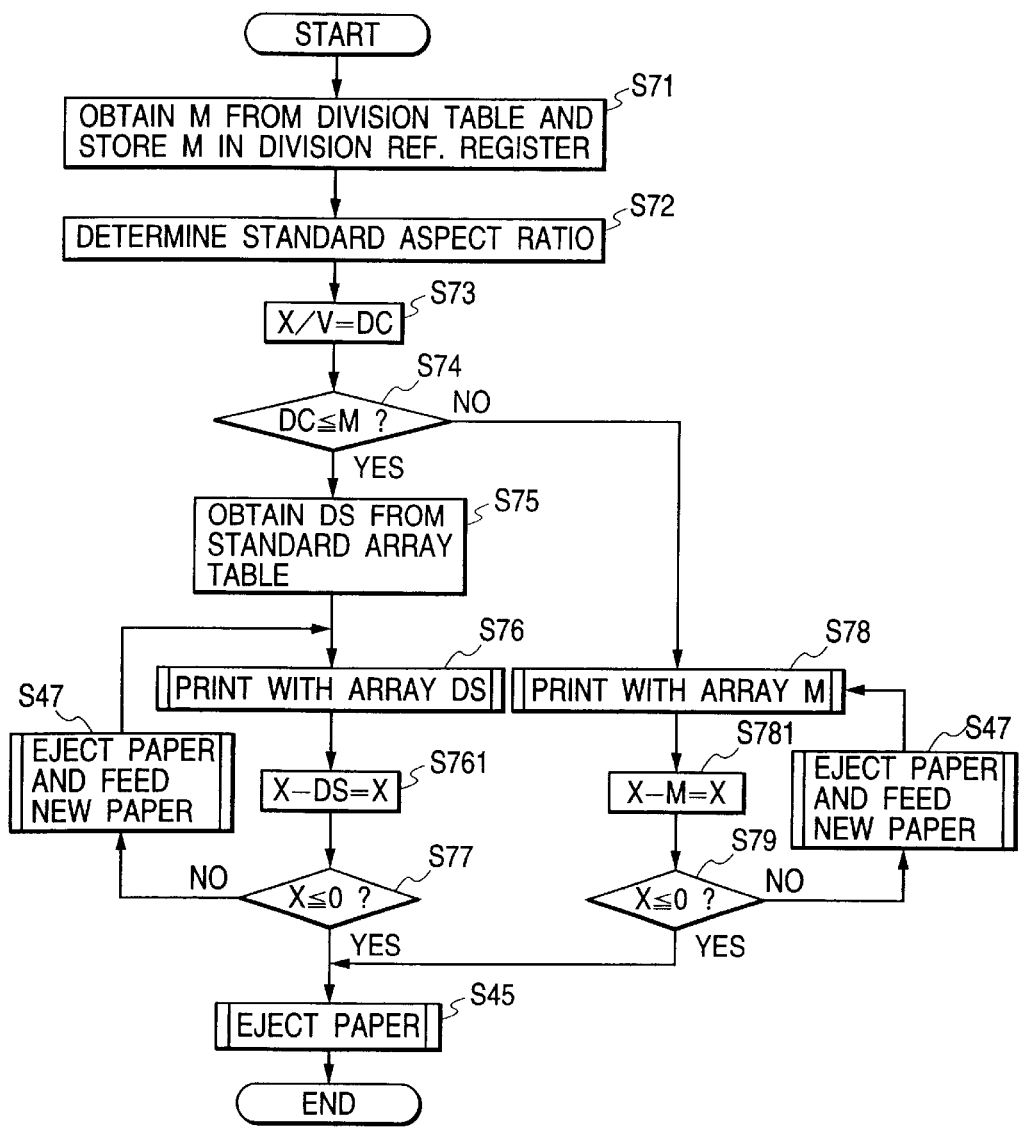
FIG. 9 is a flow chart showing the control sequence of sheet designated/same image size print control.

FIG. 9 is a flow chart of the control for executing the same image size printing, with the designation of the image number x and the sheet number v, wherein the print size per page is controlled according to the process shown in FIG. 5. At first a step S71 refers to the division table to obtain the maximum division number m for the sheet size and stores it in the reference register.

Then a step S72 determines a standard aspect ratio, by a majority decision process on the aspect ratios derived from the number of pixels of the designated plural images.

Figure 10:
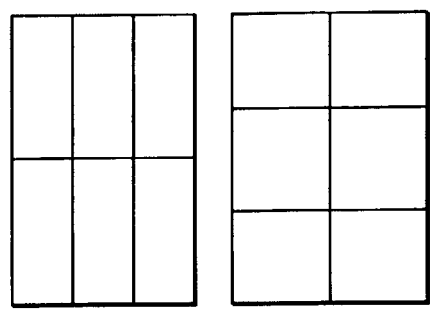
FIG. 10 is a view showing an example of difference in the aspect ratio by the difference in the dividing direction.

Then a step S73 calculates a division number dc per page. More specifically, the number of images per page, or the division number, is calculated as x/v wherein x is the designated image number and v is the sheet number. The result of calculation is rounded up to an integer dc. If a step S74 discriminates that dc does not exceed m, the sequence proceeds to a step S75 for executing the printing with dc-division, but the actual printing operation is executed with an arraying condition providing the maximum print size close to dc, by referring to the standard array table 23. As the maximum print size differs according to the dividing direction on the sheet as shown in FIG. 10, the standard array table 23 includes the combination of the dividing direction and the division number. The dividing direction may be selected, based on the aspect ratio of the image data to be printed. In case the step S74 identifies that the designated image number exceeds the maximum division number m, there is executed the m-division printing in the step S78.

As an example, in case of printing 100 images on 3 sheets, with the maximum division number of 28 per sheet, the discrimination of the step S74 provides a negative result, so that the sequence proceeds to the step S78 for printing 3 sheets with 28 images (7 in the vertical direction and 4 in the horizontal direction) per sheet, and 1 sheet with 16 images.

In the following the process of the step S76 will be explained with specific examples.

As an example, if the user designates printing of 35 images with an original aspect ratio of 4:6 on three A4-sized sheets, the value dc is calculated by 35/3=11.6666 and determined as 12, so that the row "12" of the column dc of the reference table shown in FIG. 15 is read to obtain J(vertical)/3 and K(horizontal)/4. Then the longer side is calculated from the shorter side as shown in FIGS. 16 and 17, and there is discriminated whether the calculated value can be accommodated within the actual divided size. If accommodated, such pattern is discriminated as acceptable, then the area is calculated for each acceptable pattern and there is selected a pattern with the largest area among such patterns. In the example shown in FIG. 17, (4) is selected. It is also possible to execute calculation based on the longer side as indicated by (1)', (2)', (3)' and (4)', then calculate the areas and select a pattern with the largest area.

In the following there will be explained a case in which, under the aforementioned condition setting 1, there are executed designation for the images 1, 2, 3, following by a page change command, and designation for the images 4, 5.

With respect to an apparatus capable of designating a print image and a print condition such as a digital camera or a printer, an image editing apparatus and a software, there will be explained such apparatus and software allowing description of a page change command (control command for page renewal at the printing) in addition to the designation of the image and the print condition.

Figure 21:
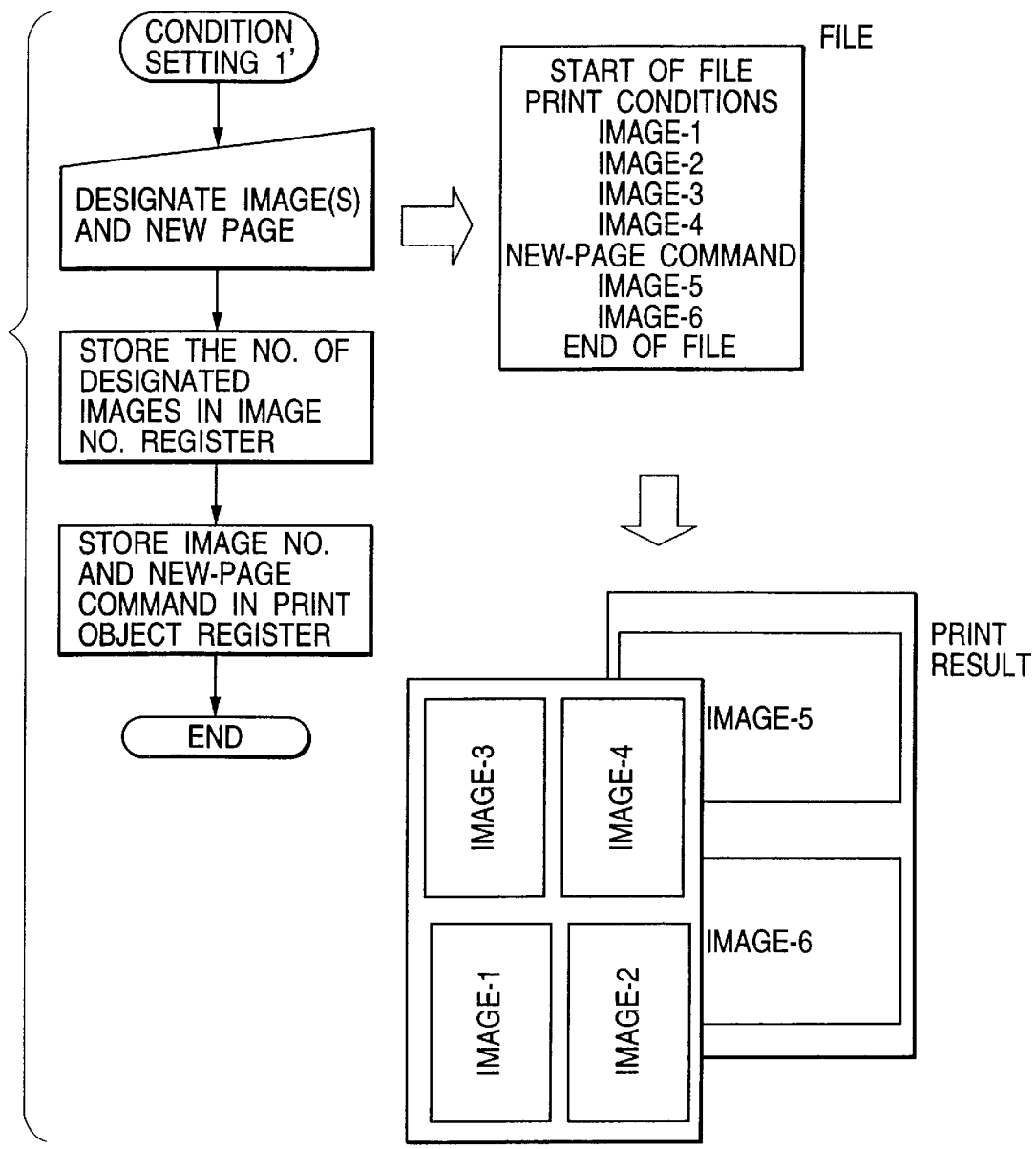
FIG. 21 is a view explaining a page change command.

In an apparatus adapted to execute selection of the print object and designation of the number of prints, size of print sheet, number of division in printing etc. thereby forming a condition setting file while confirming the image for example by a digital camera, there is provided a page change key or equivalent input means, and, if such key is selected after the selection of one or more images, a page change command is described in the image file train by a program "condition setting 1'" shown in a flow chart in FIG. 21. In response, a print object/condition setting file including a page change command in the image file train as shown in FIG. 2 is processed as a file in the non-volatile memory medium 2 in FIG. 1 or as an input from the manual input unit 6.

The file shown in FIG. 21 is used as the file 5 in FIG. 1 for entering the print object and the print condition, or the condition of the file in FIG. 21 is entered from the manual input unit 6 in FIG. 1 while the image is read from the image file 4, and the obtained print is shown also in FIG. 21.

In the present embodiment, if a page change mark is detected in the image numbers stored in the print object register at or after the step S72, the first image number after the page change mark or the number of the images between the page change mark and the preceding page change mark is detected, and such number is taken as the division number for dividing the sheet into uniform print areas. In this operation there is executed control for maximizing the uniformly divided areas for example by changing the dividing direction by 90° on the sheet while maintaining the original aspect ration.

In case the designated image number and the designated sheet number are such that the predetermined maximum number of the images per page is exceeded, there is issued a warning for adding pages to the designated sheet number, and the printing is executed with such added sheet number in case the warning is accepted.

The print object and condition are entered from the manual input unit 6 in the condition setting 1, 2, 3 or 4, but they may also be entered from the print object/condition setting file 5.

In the foregoing there has been explained the page change process by the page change command, but, for example in case, under the condition setting 1, of preparing a file A for a user A by designating images Nos. 1, 3, 7 and 12, a file B for a user B by designating images Nos. 1, 3, 7 and 16 and a file C for a user C by designating images Nos. 1, 3, 7 and 10 and collectively printing these files, it is also possible to execute the page change process by detecting the partitions between the files.

It is furthermore possible to execute the page change at the partition of each file, by setting the condition setting 1 in a digital camera or the like and, for each page change executed by the user in the digital camera, forming the plural images designated up to this point into a file.

In the following there will be explained, with reference to FIG. 11, printing control based on the information designating images and including a page change mark.

At first a step S71 refers to the division table for obtaining the maximum division number m corresponding to the sheet size and stores such division number in the reference register, and the sequence then proceeds to a step S72.

A step S72 determines the standard aspect ratio by the majority decision process of the aspect ratios derived from the pixel numbers of the designated plural images, and the sequence then proceeds to a step S81.

A step S81 discriminates whether a page change mark is present in the print object register.

If present, the sequence proceeds to a step S82 for substituting the number of images present between the page change mark and the first image number or between the page change mark and the preceding page change mark into X. If the page change mark is identified absent at all, the sequence proceeds to a step S85 for substituting the number of all the images into X. Also if the unprocessed page change mark is identified absent, the sequence proceeds to a step S85 for substituting the number of images after the preceding page change mark into X, and the sequence then proceeds to a step S83.

A step S83 calculates the division number of a page and substitutes dc into X, and the sequence proceeds to a step S74.

A step S74 discriminates whether dc does not exceed the maximum division number m. If dc does not exceed the maximum division number m, the sequence proceeds to a step S75 for obtaining the standard array DS=Y·W for the designated image aspect ratio and dc from the reference table, and the sequence proceeds to a step S76.

A step S76 executes automatic printing with the array DS, and the sequence proceeds to a step S761.

A step S761 substitutes X−DS into X and the sequence proceeds to a step S77.

A step S77 discriminates whether the printing of all the images have been completed, and, if completed, the sequence proceeds to a step S45 for discharging the sheet, thereby terminating the process. On the other hand, if not completed, the sequence proceeds to a step S47 for executing the page change process, whereupon the sequence returns to the step S81.

If the step S74 identifies that dc exceeds the maximum division number m, the sequence proceeds to a step S78 for executing print with an array m, then a step S781 for substituting X−m into X, and a step S79 for discriminating whether the printing in front of the page change mark has been completed. If completed, the sequence proceeds to a step S77, but, if not completed, the sequence proceeds to the step S47 for executing the page change process, whereupon the sequence returns to the step S78.

As explained in the foregoing, by executing printing with designation of the page change mark together with the images to be printed, the page change can be realized at an arbitrary position in the course of printing even if the number of images to be printed on a page is designated. It is therefore rendered possible to change the page basically at the designated image number and also to change the page at a partition desired by the user.

Figure 11:
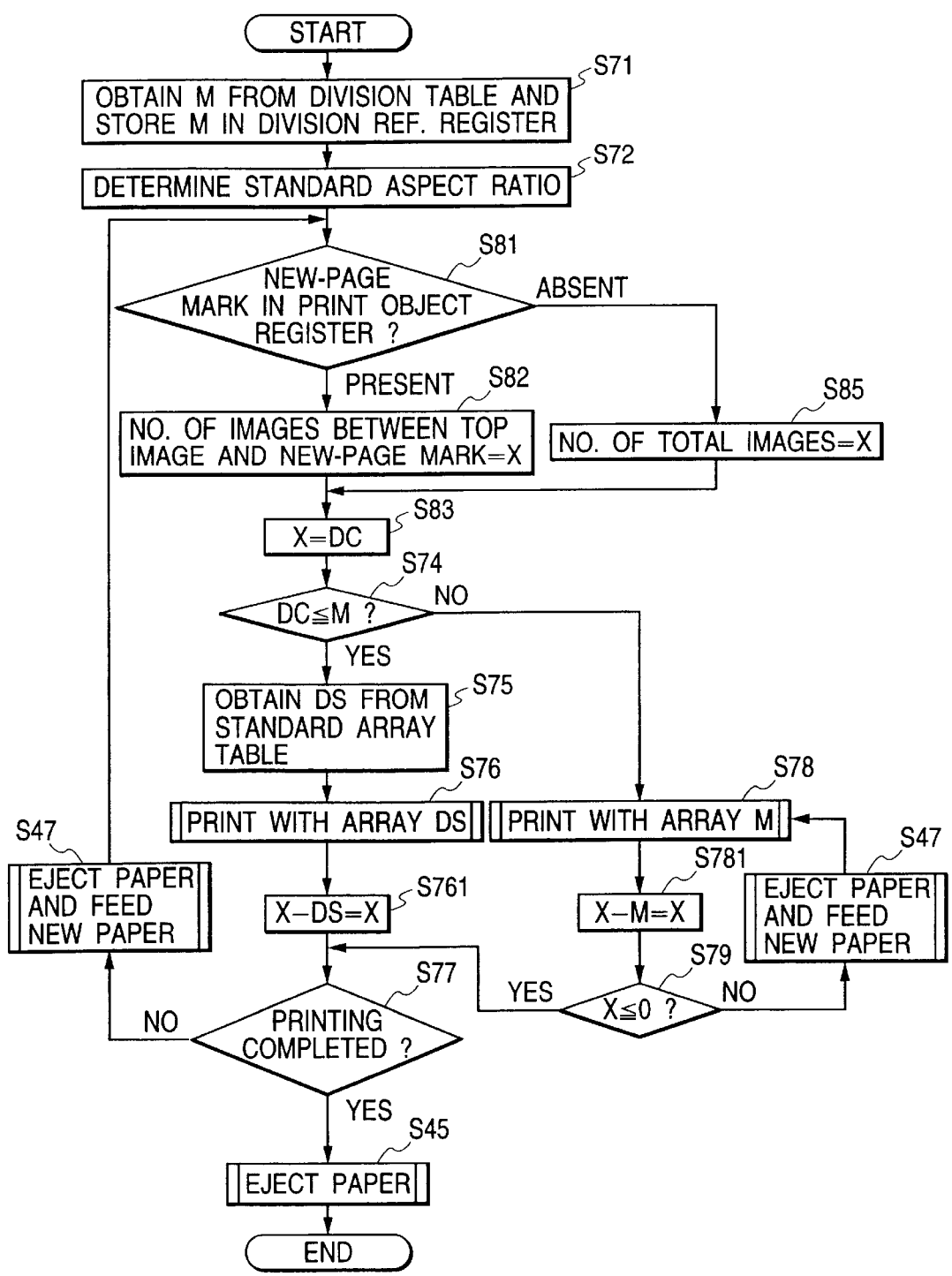
FIG. 11 is a flow chart showing the control sequence of sheet designated/same image size page change control.
Figure 19:
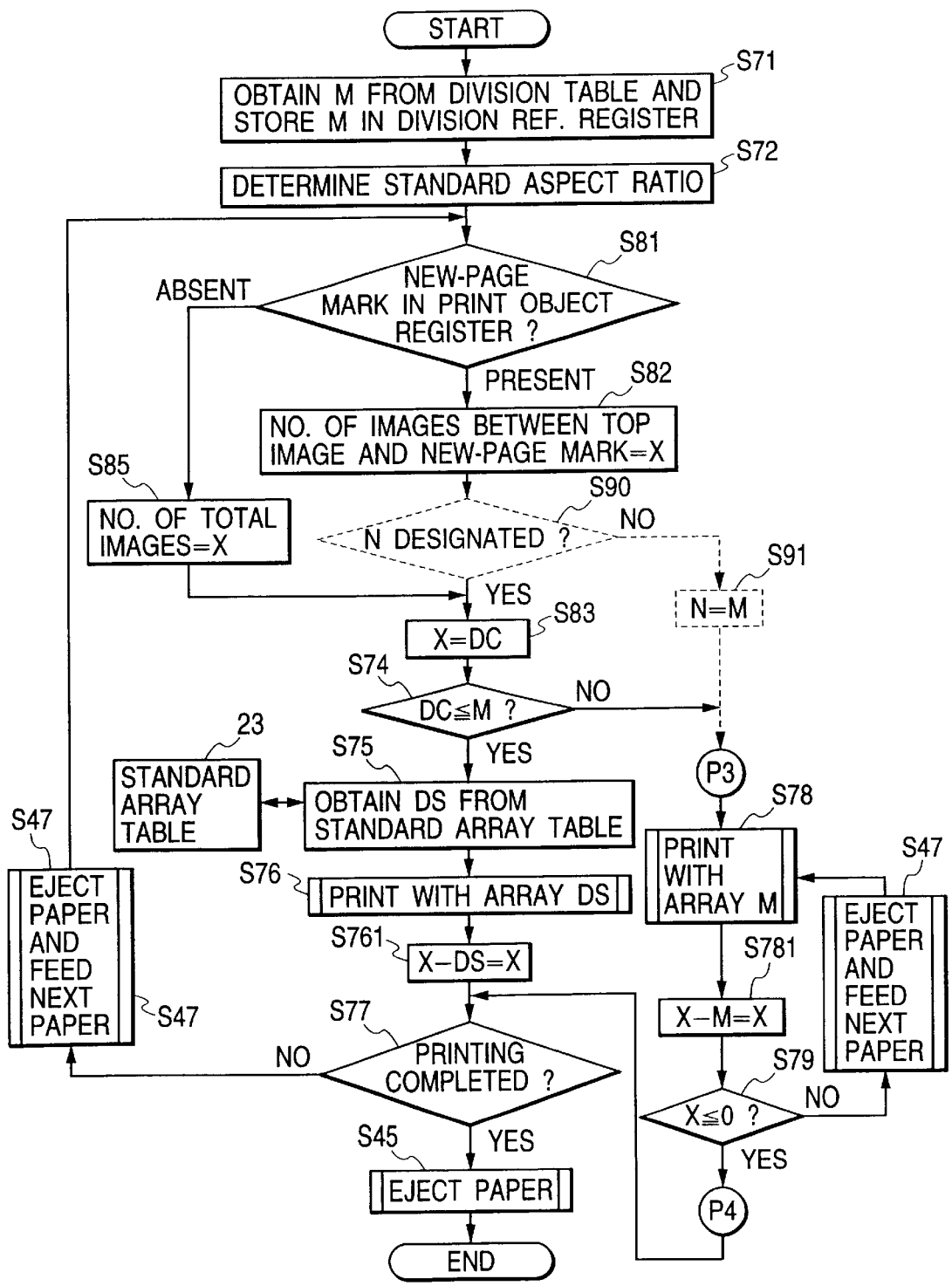
FIG. 19 is a flow chart showing the control sequence of sheet designation and division designated print control by page change control.

In contrast to the control sequence shown in FIG. 11, FIG. 19 shows an example of control for printing the plural images, designated by the detection of the page change command, with the designated division number. Between the steps S82 and S83 in FIG. 11, there is inserted a step S90 for discriminating the presence or absence of designation of division, and, if division n is designated by the condition setting 3, there is executed a process from P3 to P4, taking n as the maximum division number m.

Also the process from P3 to P4 may be executed between P1 and P2 in FIG. 8.

Figure 20:
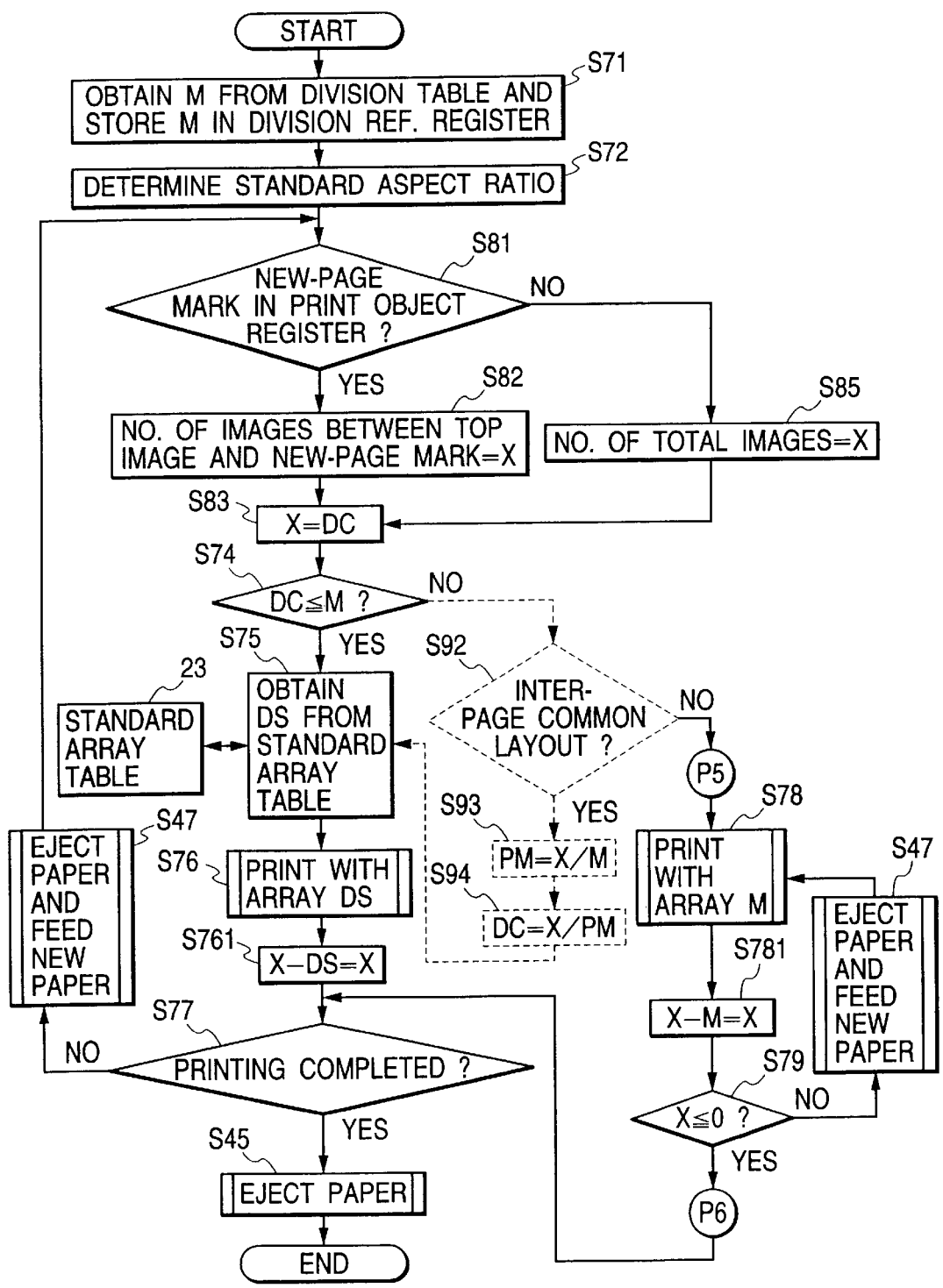
FIG. 20 is a flow chart showing the control sequence of sheet designation and same image size print control by page change control.

In the control sequence in FIG. 11, if the number of images designated by the detection of page change command exceeds the maximum division number designated for the sheet, the printing is to be made on plural sheets, and FIG. 20 adds a control sequence for obtaining a uniform maximum size in the sheets required in such case.

In the event that the step S74 in FIG. 11 identifies that the number of the designated images is larger than the maximum division number and if a step S92 designates a uniform array of images among the sheets, a step S93 calculates the necessary number PM of sheets, by calculating X/M and rounding up the result to an integer. Then a step S94 calculates the division number DC per sheet, by calculating X/PM and rounding up the result to an integer. The process starting from the step S75 is executed with thus determined value to achieve printing with uniform array among pages. The process from P5 to P6 may also be executed between P1 and P2 in FIG. 8.

In the present embodiment, the appropriate array print control apparatus for the images can be realized by a digital camera.

It may also be realized by a computer, or an image print order receiving apparatus, or an image processing software.

The embodiment of the present invention allows to avoid inefficient use of the print sheets in case of divided printing over plural print sheets, such as only one image printed on the last page.

Also in contrast to the conventional printing process in which the designation and the printing operation have to be repeated in the unit of each page, the present invention allows to obtain the print result desired by the use in automatic-processing without cumbersome operations, by executing the designation of the sheet size and sheet number and the selection of the images to be printed, collectively in the beginning or by merely mounting the non-volatile memory medium, storing the print conditions and the group of images, on the print control apparatus.

In the foregoing embodiments of the present invention, the division number means the number of images to be arrayed on a sheet at printing.

As explained in the foregoing, the present invention enables printing with the designated number of image and with automatic page change.

There can also be prevented a situation where only one image is printed on the last page.

Also the printing can be achieved with the optimum layout based on the number of images and the sheet size.

Also the images can be printed with a maximum size.

Also the plural images can be printed with partition at the designated position, regardless of the designation of the division number.

Furthermore, the printing operation can be achieved by selecting desired one among various modes.

What is claimed is:

1. An image processing apparatus comprising:
an input unit, adapted for entering a number N that shows the number of images to be printed on one page; and
a process unit adapted, in the event that a number X that shows the number of remaining images is larger than the number N entered by said input unit, for executing a process of printing the X remaining images on one page if the number X is smaller than or equal to the sum of the number N and a number E that shows the number of images which can be additionally printed on the one page, and for executing a process of printing the N images from among the X remaining images on one page if the number X is larger than the sum of the number N and the number E.

2. An image processing apparatus according to claim 1, further comprising a printing unit adapted for printing an image.

3. An image processing apparatus according to claim 1, further comprising a setting unit adapted for setting the number E based on the size of sheet used for printing and the number N entered by said input unit.

4. An image processing apparatus according to claim 1, wherein said process unit is adapted to execute a process of printing the remaining images on a page by decreasing the margin between the images.

5. An image processing apparatus according to claim 1, wherein said process unit executes a process of printing the X remaining images on one page in the event that the number X does not exceed the number N entered by said input unit.

6. An image processing apparatus comprising:

an input unit, adapted for entering a number N that shows the number of images to be printed on one page; and a process unit adapted, if a number X that shows the number of remaining images does not exceed the number N entered by said input unit, for executing a process of printing the X remaining images on one page, and if the number X exceeds the number N but does not exceeds a maximum division number M, for executing a process of printing the X remaining images on one page with a layout change for printing the remaining pages on the one page.

7. An image processing method comprising:

an input step, of entering a number N that shows the number of images to be printed on one page; and a process step, of, in the event that a number X that shows the number of remaining images is larger than the number N entered in said input step, executing a process of printing X remaining images on one page if the number X is smaller than or equal to the sum of the number N and a number E that shows the number of images which can be additionally printed on the one page, and executing a process of printing the N images from among the X remaining images on one page if the number X is larger than the sum of the number N and the number E.

8. An image processing method according to claim 7, further comprising a printing step, of printing an image.

9. An image processing method according to claim 7, further comprising a setting step, of setting the number E based on the size of sheet used for printing and the number N entered in said input step.

10. An image processing method according to claim 7, wherein said process step includes executing a process of printing the remaining images on a page by decreasing the margin between the images.

11. An image processing method according to claim 7, wherein said process step includes executing a process of printing the X remaining images on one page in the event that the number X does not exceed the number N entered in said input step.

12. An image processing method comprising:

an input step, of entering a number N that shows the number of images to be printed on one page; and a process step, of, if the number X that shows the number of remaining images does not exceed the number N entered in said input step, executing a process of printing the X remaining images on one page, and if the number X exceeds the number N but does not exceed a maximum division number M, executing a process of printing the X remaining images on one page with a layout change for printing the remaining pages on the one page.

13. A computer program for executing an image processing method, said program comprising:

code for an input step of entering a number N that shows the number of images to be printed on one page; and code for a process step, of in the event that a number X that shows the number of remaining images is larger than the number N entered in said input step, executing a process of printing X remaining images on one page if the number X is smaller than or equal to the sum of the number N and a number E that shows the number of images which can be additionally printed on the one page, and for executing a process of printing the N images from among the X remaining images on one page if the number X is larger than the sum of the number N and the number E.

14. A program according to claim 13, further comprising code for a printing step, of printing an image.

15. A program according to claim 13, further comprising code for a setting step, of setting the number E based on the size of sheet used for printing and the number N entered in said input step.

16. A program according to claim 13, wherein said process step includes executing a process of printing the remaining images on a page by decreasing the margin between the images.

17. A program according to claim 13, wherein said process step includes executing a process of printing the X remaining images on one page in the event that the number X does not exceed the number N entered in said input step.

18. A computer program for executing an image processing method, said program comprising:

code for an input step, of entering a number N that shows the number of images to be printed on one page; and code for a process step, of, if the number X that shows the number of remaining images does not exceed the number N entered in said input step, executing a process of printing the X remaining images on one page, and if the number X exceeds the number N but does not exceed a maximum division number M, executing a process of printing the X remaining images on one page with a layout change for printing the remaining pages on the one page.

\* \* \* \* \*